(12) United States Patent
Schlageter et al.

(10) Patent No.: US 7,257,354 B2
(45) Date of Patent: Aug. 14, 2007

(54) DEVICE AND METHOD FOR THE REPLACEMENT OF OUT-OF-DATE DEVELOPER

(75) Inventors: Bernhard Schlageter, Unterhaching (DE); Uwe Höllig, München (DE)

(73) Assignee: Oce Printing Systems GmbH, Poing (DE)

( * ) Notice: Subject to any disclaimer, the term of this patent is extended or adjusted under 35 U.S.C. 154(b) by 97 days.

(21) Appl. No.: 10/468,237

(22) PCT Filed: Feb. 18, 2002

(86) PCT No.: PCT/EP02/01708

§ 371 (c)(1),
(2), (4) Date: Feb. 2, 2004

(87) PCT Pub. No.: WO02/067060

PCT Pub. Date: Aug. 29, 2002

(65) Prior Publication Data

US 2004/0120732 A1   Jun. 24, 2004

(30) Foreign Application Priority Data

Feb. 19, 2001   (DE) .................. 101 07 647

(51) Int. Cl.
*G03G 15/08* (2006.01)
(52) U.S. Cl. .................. 399/257; 222/DIG. 1
(58) Field of Classification Search ........ 399/254–262, 399/358–360; 222/DIG. 1
See application file for complete search history.

(56) References Cited

U.S. PATENT DOCUMENTS

| 4,358,196 A | 11/1982 | Mugrauer |
| 5,095,338 A | 3/1992 | Hayes, Jr. et al. |
| 5,450,178 A | 9/1995 | Kawashima et al. |
| 5,592,270 A | 1/1997 | Takai et al. |
| 5,933,690 A | 8/1999 | Sugimoto et al. |

FOREIGN PATENT DOCUMENTS

| EP | 0 043 505 | 1/1982 |
| EP | 0 468 604 | 1/1992 |
| WO | WO98/39691 | 9/1998 |
| WO | WO 01/02170 | 1/2001 |
| WO | WO 01/06325 | 1/2001 |

OTHER PUBLICATIONS

European Patent Office Patent Abstracts of Japan—Publication No. 59100471-Sep. 6, 1984.
European Patent Office Patent Abstracts of Japan No. 2000122424-Pub. Date 04-2800.

*Primary Examiner*—David M. Gray
*Assistant Examiner*—Ryan Gleitz
(74) *Attorney, Agent, or Firm*—Schiff Hardin LLP (57) ABSTRACT

In order to replace out-of date flowing medium (16) in a system, comprising a component which ages, a defined amount of out-of-date flowing medium (16) is removed and the same amount of fresh flowing medium or fresh components (14) added and a given level (17") of the flowing medium maintained.

7 Claims, 6 Drawing Sheets

DEVICE AND METHOD FOR THE REPLACEMENT OF OUT-OF-DATE DEVELOPER

BACKGROUND OF THE INVENTION

The invention concerns a device and a method to replace at least one component of a pourable medium. Furthermore, the invention concerns the use of such a device in a printer or copier.

Examples of systems in which pourable medium are used are electro-photographic or ionographic printers or copiers. The pourable medium used therein is a developer, especially a two-component developer, that contains a toner and a magnetic carrier respectively in particle form.

In printers or copiers operating according to the electro-photographic principle, charge images of characters (such as texts or drawings) to be printed are generated on an intermediate carrier, for example a drum with an electro-photographic layer. The intermediate carrier with the charge images is directed into a development station in which the charge images are developed and thereby made visible. Upon the development, the toner particles of a two-component developer are conveyed in the direction of the intermediate carrier and are electrically attracted onto the intermediate carrier by the charge carrier. The carrier particles are conveyed back to the development station. The developed charge images are transferred and fixed upon a recording medium, for example a paper web. The toner material within the two-component developer is used in the development event. Fresh toner material is refilled corresponding to this use. The carrier material conveyed back is subject to an aging process, whereby the print quality or copy quality can suffer. Therefore, it is also necessary to renew the carrier material little by little.

A printer device or copier device is specified in WO 98/39691 (of which reference is made here to its entire disclosure) in which a recording medium can be printed upon in monochrome and/or color. A plurality of developer stations are thereby provided for which, respectively, one color is associated for one colored print. In order to maintain the print quality in printers of such a type, a replacement must occur at specific time intervals due to the expiration of the developer or the expired components contained therein in the form of the carrier. For example, this could hitherto occur such that development stations are completely emptied and subsequently filled, which is very time-consuming and is associated with an interruption of the operation of the printer or copier.

Replacement of the developer with expired carrier with fresh developer can also occur such that developer stations are supplied with fresh toner and fresh carrier separate from one another, such that a definite amount of the toner and carrier ensuring the print quality or copy quality is always present in the developer, such that the printer operation or copier operation must not be interrupted.

A device for the replacement of expired developer with fresh developer in a development station of an electro-photographic device is known from U.S. Pat. No. 4,358,196. This known device comprises two metering devices, via one of which fresh developer is supplied to the developer station, and via the other of which expired developer is removed from the development station, such that a developer ensuring good print quality is always present in the development station.

Given replacement of the developer with expired carrier, it is important that a specific volume of developer with a defined toner concentration and carrier concentration (meaning a defined proportion of toner to carrier) is always present in a development station. Over the entire lifespan of a printing device, a total fill quantity of developer guaranteeing proper functioning must always be present. The toner concentration can be regulated in its own regulation cycle, such that an amount of toner ensuring the print quality is always present in the development station. The regulation can occur such that the toner concentration is detected and regulated either directly by means of a sensor, or indirectly via detection of the inking of the printing. However, given direct regulation, the toner concentration cannot be precisely determined due to inevitable control deviations, and given indirect regulation, the toner concentration can in part not be determined at all, whereby losses in quality can arise.

Typically, the ratio of toner to carrier for the volume of the supplied two-component developer is known. However, the ratio of toner to carrier in the volume of the removed developer can vary from the ratio in the supplied developer, because the toner concentration in the development station can vary higher or lower than the toner concentration of the supplied developer due to the control deviations. However, because both volumes are equal, the proportion of the carrier in the removed developer can vary higher or lower than the proportion of the carrier in the supplied developer.

If the replacement of the developer is implemented uniformly and constantly, as is the case in the device according to the US patent specification cited above, the carrier quantity in the developer station can drift ever further higher or lower, given a large number of alternating cycles. This means that the development station can overflow or run empty in the extreme case, whereby the printer or copier is incapable of functioning.

A device and a method for the replacement of at least one component of a pourable medium is known from EP 0 043 505 A2. The pourable medium with the expired component is removed from a container, and a quantity of fresh pourable medium is supplied into the container. Two metering devices are provided, from the first of which the developer station is constantly supplied fresh developer, and from the other of which used developer is constantly removed from the developer station in an equal quantity.

A developer station is known from U.S. Pat. No. 5,450,178, in which a mix of toner and carrier particles is present in an upper chamber according to the exemplary embodiment according to FIG. 4. The proportion of toner is higher than is necessary for the typical usage. The mix from the upper chamber is transferred little by little into a container, whereby a expired mixture in this container is dispensed into a lower chamber, dependent on the signal of a sensor that analyzes the contents in the container. In this manner, the total quantity of the mixture can be maintained at a constant value.

A developer unit is known from U.S. Pat. No. 5,095,338, in which a mixture of toner particles and carrier particles is present in a chamber (compare in particular FIG. 2). A quantity of carrier particles and toner particles is supplied from the container to the development material in the chamber. The ratio of toner particles to carrier particles in the container is greater than in the chamber, such that expired developer material is continually renewed. A sensor system observes the composition of the development material in the chamber and initiates via a controller the supply of fresh developer material.

A copier with at least two developer stations for at least two different colors is known from EP 0 043 505 A2, in which a fresh developer component is supplied from a common reservoir container to these developer stations at the respective supply intake. This developer is a liquid developer.

Reference is made to the documents JP 59 100 471 A, JP 2000 122 424 A, and WO 01/06325 A as further relevant prior art.

SUMMARY OF THE INVENTION

An object of the invention is to specify a device and a method in which the expired component in a container is continually renewed, and the properties of the pourable medium remain largely the same.

A method and device are provided from removal of at least one expired component of a pourable medium. At a removal output, at least the expired component of the pourable medium is removed from a container, and a quantity of at least one of fresh pourable medium and fresh component is supplied at a supply input to the container. The supply of the quantity of at least one of the fresh medium and the fresh component and the removal of the quantity of medium with an expired component occurs such that a fill level of the medium in a container remains approximately the same. A state of the supply input is set dependent upon a pressure of at least one of the fresh pourable medium and the fresh component prevalent at an opening of the supply input.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

A fresh pourable medium or, alternatively, only the fresh component is continuously supplied to the container. Inside the container, the fill level of the medium is maintained at a constant value, whereby compensation events are observed. In this manner, the expired component in the medium is replaced little by little, such that the properties of the medium (which is a mixture) remain largely the same. What is particularly advantageous is that a developer is used as a pourable medium to develop a latent image. Such a developer can be fluid or formed of particles. In particular, two-component developers can be used that, in addition to a toner material, also contain a carrier material made from magnetic particles. The expired carrier can be supplied alone as fresh material to the container; alternatively, fresh developer that also contains toner material in addition to the expired carrier can also be supplied.

According to a further aspect, a printer or copier is specified that comprises a plurality of developer stations for a plurality of different colors. Each developer station comprises a device according to the type of the device further mentioned above, within which the expired component of the pourable medium is exchanged little by little. Each developer station receives fresh expired component, in particular carrier material in a two-component developer, from a reservoir container common to all developer stations. Furthermore, each developer station has a separate toner reservoir container from which toner of the respective color is supplied to the container of the respective developer station. In this manner, it is possible to collectively supply with carrier material a plurality of developer stations with differently colored toner material, such that the expired carrier material in each developer station is exchanged little by little. It is also not necessary to undertake a separate exchange of carrier material or developer for each developer station.

Figure 1:
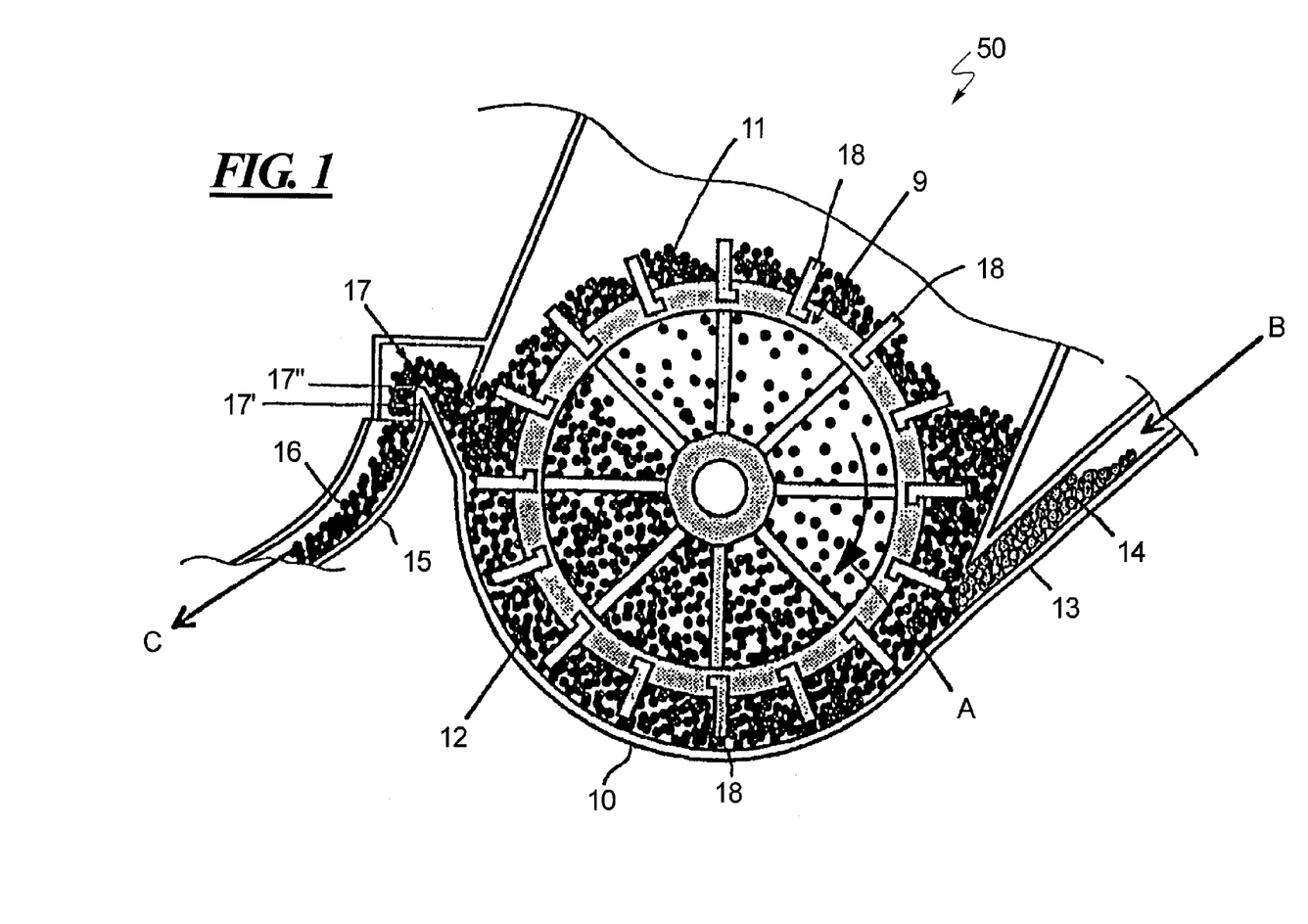
FIG. 1 is a first exemplary embodiment of a device.

The invention is subsequently more closely explained using exemplary embodiments according to the figures of the drawings. Thereby shown are:

FIG. 1 shows a first exemplary embodiment in a development station 50 of an electro-photographic device, for example an electro-photographic printer or copier, shown excerpted. The device comprises a container 10 for a composite two-component developer 11 made from toner particles and carrier particles. The container 10 comprises a paddle wheel 9 with scoops or paddles 18 that rotate in the direction of an arrow A. The developer 11 forms a developer sump 12 in the lower part of the container 10.

A supply input 13 is provided on one side of the container 10, via which fresh developer that contains the toner and carrier in a predetermined ratio or, alternatively, only fresh carrier 14 is supplied in the direction of an arrow B. In the latter case, toner from a toner container is supplied via an additional feed (not shown). On the side of the container 10 opposite the supply input 13, a removal output 15 is provided via which expired developer 16 that contains the expired carrier and toner is removed in the direction of an arrow C. The expired developer 16 is directed via an overflow device 17 in the connection region of the removal output 15 of the container 10. This overflow 17 is designed in the form of a trap standing on its head and contains a nose 17' whose tip defines a predetermined developer fill level 17".

If a predetermined quantity of fresh developer or fresh carrier 14 is supplied to the container 10 via the supply input 13, the fill level rises over the predetermined developer fill level 17" and, because the removal output 15 is in the range of the predetermined developer fill level 17", the same amount of expired developer 16 is removed via the overflow 17. The fill level in the container 10 therefore regulates itself dependent on the predetermined developer fill level 17" and the supply quantity. The event continues until the predetermined developer fill level 17" is once again reached.

The supply input 13 and the removal output 15 are preferably arranged in the container 10 such that supplied fresh developer or fresh carrier 14 can not drain off together with the expired developer 16 during the replacement event. This is the case in the exemplary embodiment according to FIG. 1, when the input and output 13 or 15 arranged on opposite sides of the container 10.

Figure 2A:
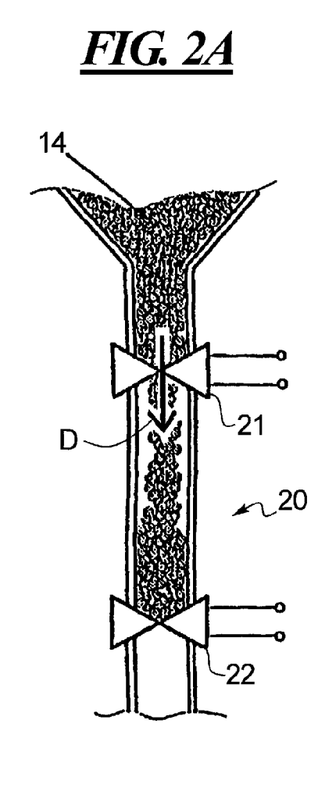
FIGS. 2A through 2C are an exemplary embodiment to determine a predetermined quantity of a pourable medium for the supply to the device according to FIG. 1.
Figure 2B:
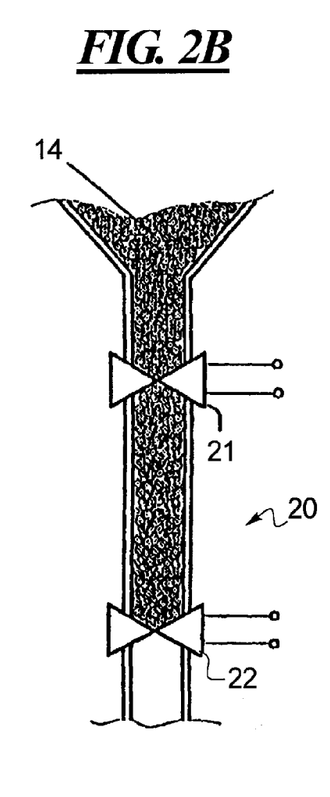
Figure 2C:
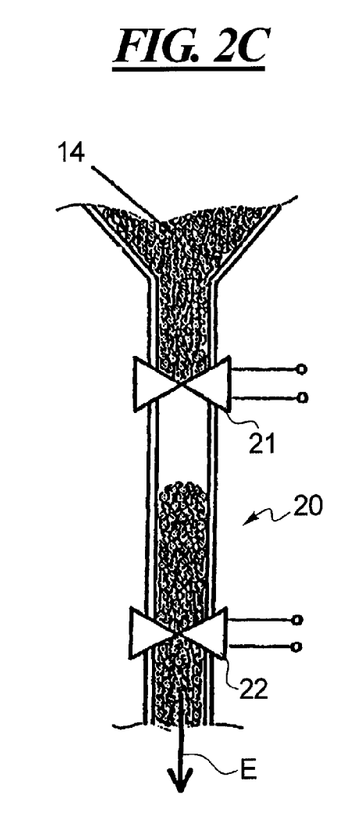

The FIGS. 2A to 2C show an exemplary embodiment for the measurement of a predetermined quantity of fresh developer or carrier 14. Two synchronized vents 21 and 22 are provided one behind the other or, respectively, one under the other in a tube 20 leading to the supply input 13 according to FIG. 1 in which fresh developer or fresh carrier 14 is fed in from above.

In a first phase according to FIG. 2A, the valve 21 is open and the valve 22 is closed, such that fresh developer or fresh carrier 14 is directed in the direction of an arrow D via the tube 20 to the closed valve 22. The opening time of the valve 21 defines a determined quantity of fresh developer or fresh carrier 14.

In a second phase according to FIG. 2B, both valves 21 and 22 are closed, whereby the predetermined quantity of developer or carrier to be supplied to the mixer 10 according to FIG. 1 is measured, i.e. this quantity is contained between the two valves 21 and 22.

In a third phase according to FIG. 2C, the valve 21 is closed and the valve 22 is opened, such that the quantity of developer or carrier located between the two valves 21 and 22 drains off in the direction of an arrow E to the developer supply input 13 according to FIG. 1.

Figure 3:
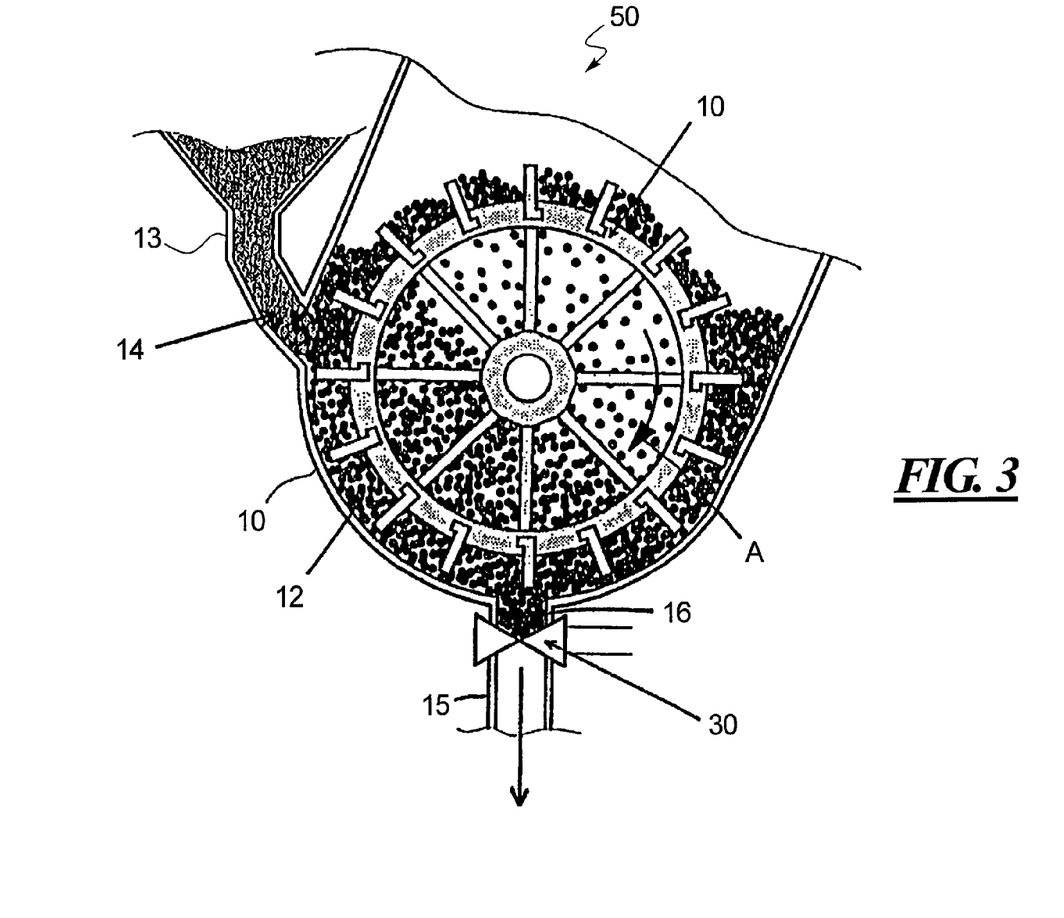
FIG. 3 is a second exemplary embodiment of a device.

FIG. 3, in which identical elements as in FIG. 1 are provided with identical reference numbers, shows a second exemplary embodiment in which, in contrast to the exemplary embodiment according to FIG. 1, the supply of fresh developer or fresh carrier 14 is regulated via the removal or expired developer 16. As in the exemplary embodiment according to FIG. 1, this exemplary embodiment is also a self-regulating device due to a predetermined developer fill level in the container 10. A synchronized valve 30 is provided in the removal output 15 whose opening time fixes the quantity of removed expired developer 16. If the developer fill level sinks by a certain amount, the same amount of fresh developer or carrier 14 is supplied via the supply input 13.

The developer supply input 13 in the exemplary embodiment according to FIG. 3 must terminate at least with the desired developer fill level. The exact vertical position is thereby furthermore directed according to the pressure created by the mixture in the developer sump 12 at the predetermined developer fill level in order to block the inflow of fresh developer or carrier 14 via the developer mixture itself. Due to the removal of expired developer 16, the total amount of developer in the developer sump 12 decreases and therewith leads to a lowered developer level and simultaneously to a lower pressure at the output of the supply input 13. Due to this lower pressure at the supply input 13, fresh developer or carrier 14 can be supplied. This process continues until the predetermined developer fill level is reached again or, respectively, the counter-pressure at the output of the supply input 13 blocks the supply of fresh developer or carrier 14.

In summary, the position of the supply input 13 is established dependent on the pressure of the medium prevailing at the output of the supply input 13.

The determination of a predetermined quantity of developer or carrier, in addition to the setting via the valve 30, can alternatively also occur via suction extraction or a feed screw in the lower part of the developer sump 12, which is, however, not shown in FIG. 3.

Figure 4:
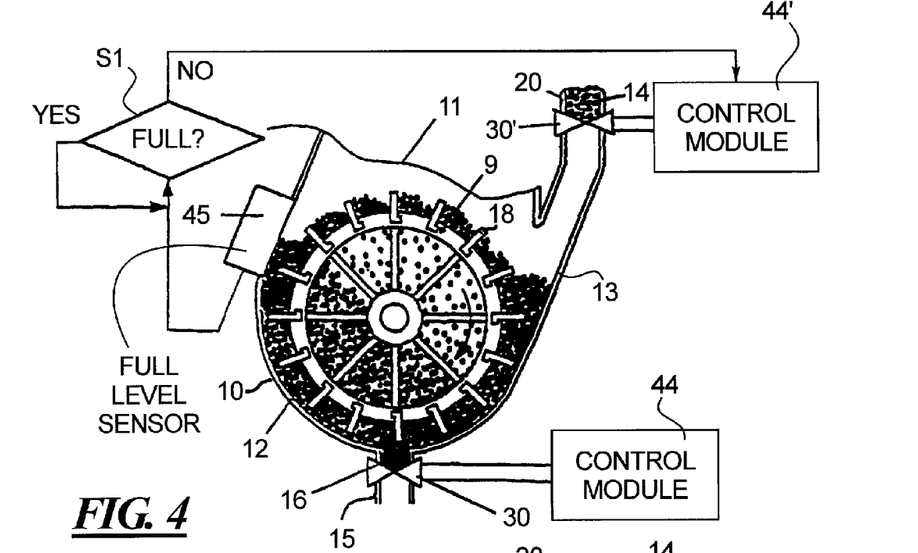
FIG. 4 is a third exemplary embodiment of a device.
Figure 5:
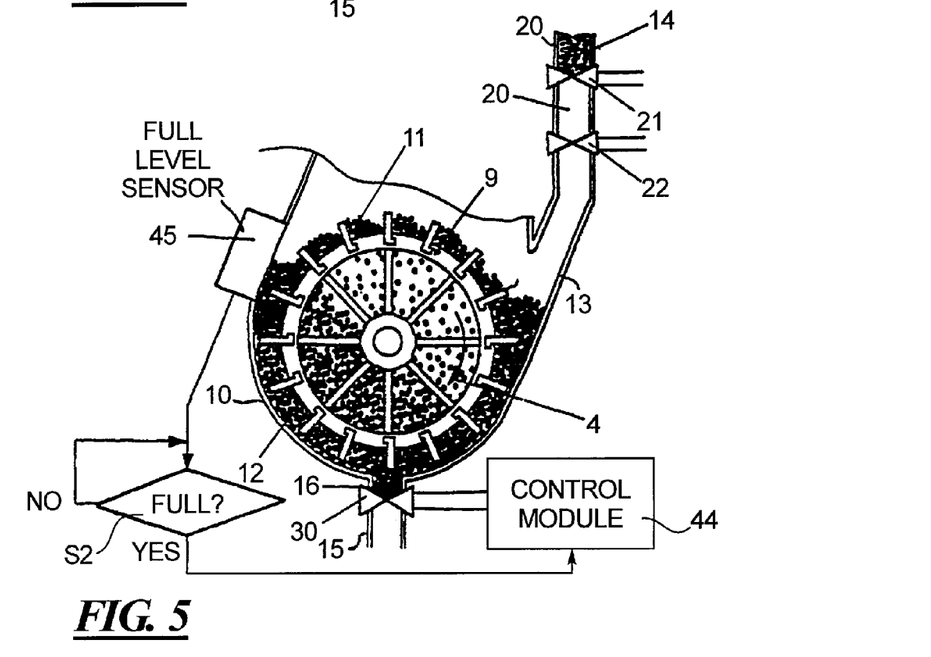
FIG. 5 is a fourth exemplary embodiment of a device.

The predetermined fill level is defined by a fill level sensor 45 in the exemplary embodiments according to FIGS. 4 and 5, whose elements that are the same as in the previous figures are provided with the same reference numbers.

In the exemplary embodiment according to FIG. 4, the valve 30 synchronized in the removal output 15, whose opening time sets the quantity of the removed expired developer (compare this to FIG. 3), is controlled by a control module 44.

Via the fill level sensor 45, it is determined whether the developer in the container 10 has reached the predetermined fill level or not. A decision is made with regards to this according to a control block S1, whether or not the condition of the fill level "full" is reached. If this is not the case (i.e. the decision "no" is made), a valve control module 44' is activated that controls, for its part, a valve 30' by which fresh developer or fresh carrier 14 is supplied to the supply input 13 via a supply tube 20. This occurs until the fill level sensor 45 determines that the predetermined fill level is reached.

If the fill level "full" is reached (i.e., the decision "yes" is made in the control block), the valve control module 44' is no longer activated (i.e. fresh developer or carrier 14 is no longer supplied).

In the exemplary embodiment according to FIG. 5, a determined quantity or a determined volume of fresh developer or carrier 14 is supplied via a device corresponding to the FIGS. 2A to 2C with two valves 21 and 22. For the function of the two valves 21 and 22, refer to the embodiments according to the FIGS. 2A to 2C. It is determined by the fill level sensor 45 whether or not the developer in the container 10 has exceeded the predetermined fill level. A decision is thereby made by the control block S2 whether or not the condition of the fill level "full" is reached. If this is the case (i.e. a decision "yes" is made), the valve control module 44 is activated that controls, for its part, the valve 30, by which the removal output 15 of expired developer 16 is supplied. This occurs until the fill level sensor 45 determines that the predetermined fill level is once again reached.

If the fill level "full" is clearly fallen short of (i.e. the decision "no" is made in the control block S2), the valve control module 44 is no longer activated (i.e. expired developer 16 is no longer removed).

Figure 6:
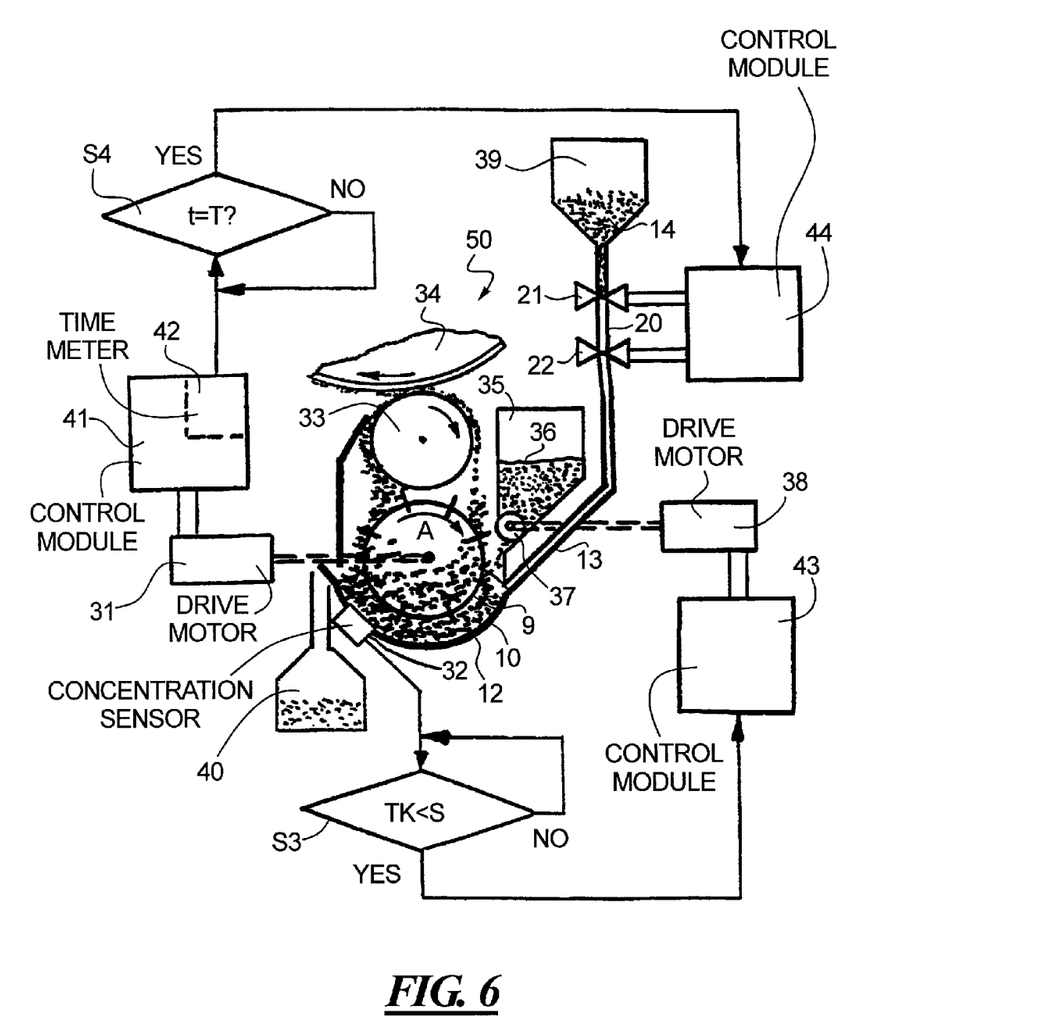
FIG. 6 is a schematic representation of a complete system of a developer station of an electro-photographic printer or copier with a device.

FIG. 6 shows an exemplary embodiment of a completely implemented development station, in which two separate control loops for toner supply or carrier supply to the mixture container 10 are provided. The toner concentration TK in the container 10 is detected by a toner concentration sensor 32, by which a decision is made as to whether or not the toner concentration TK is lower than a desired value. This toner concentration TK is typically defined as a percent value of the weight of toner within the developer. Typical TK values are 2 to 10%. A TK value of 6% means that 6 g of toner are contained in 100 g of developer. The toner supply occurs from the toner reservoir container 35 containing a toner 36, to which a toner conveying drum is provided which is driven by a driving motor 38.

If it is established that the toner concentration TK is lower than the desired value S (i.e. the decision "yes" is made in the control block S3), a control module 43 for the driving motor is activated that, for its part, operates the toner conveying drum 37 in terms of the supply of toner to the container 10.

An intermediate carrier 34, which can be a drum with an electro-photographic layer, is inked by an inking drum 33 by means of a two-component developer that is comprised, as mentioned, from toner and carrier.

A driving motor 31 for the paddlewheel 9 is controlled with a time meter by a control module 41. A change interval T is set by the time meter 42, in which fresh developer or fresh carrier 14 is respectively supplied. As was already specified using the exemplary embodiments according to FIGS. 1 and 5 in connection with the exemplary embodiment according to the FIGS. 2A to 2C, given a decision by the control block S4 that the change interval T is elapsed (i.e. upon the query t=T, the decision is "yes"), the valves 21 and 22 are activated by the valve control module 44 in terms of the supply of fresh developer or carrier 14 to the mixer 10 via the supply input 13. Upon a decision "no" (i.e. the change interval T is not yet elapsed), the valve control module 44 is not activated, and therefore no fresh developer or carrier 14 is supplied.

Figure 7:
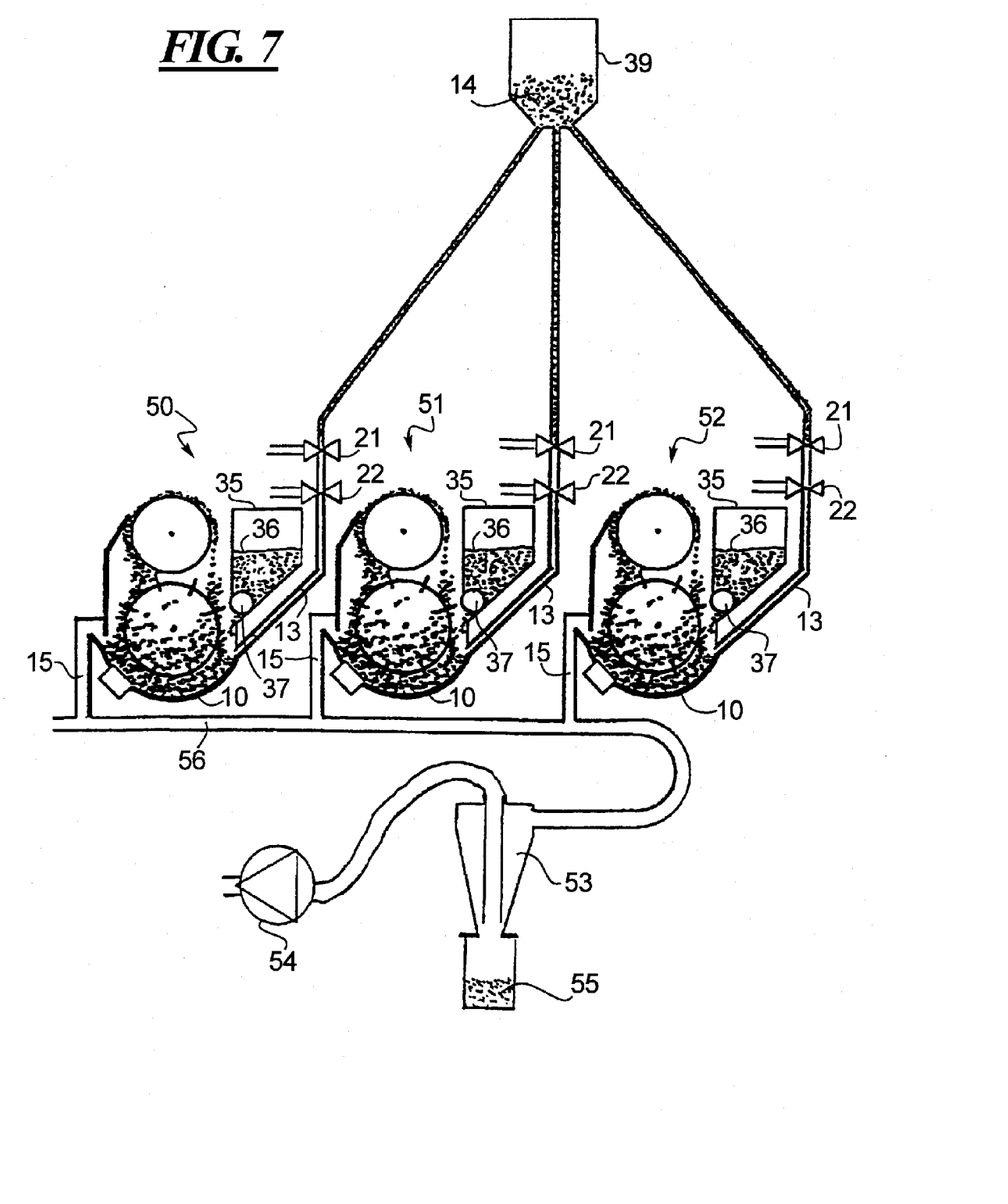
FIG. 7 is a schematic representation of a plurality of developer stations of an electro-photographic printer or copier with a single device to supply fresh pourable medium to these stations.

FIG. 7 shows an exemplary embodiment with a plurality of developer stations 50, 51, 52 for a printing with, respectively, various colors. In this exemplary embodiment, it is provided that exclusively fresh carrier 14 is collectively supplied from the common reservoir container 39 to the development stations 50 to 52. As specified using the exemplary embodiments according to FIGS. 1 to 5, expired developer is removed respectively via a removal output 15 and a common duct 56, whereby this removal can occur via a cyclone filter 53 attached to a fan 54. The filtered developer 55 contains different-colored toner and can no longer be used.

An important advantage of the exemplary embodiment according to FIG. 7 can be seen in that, on the one hand, a continuous exchange of a pourable medium (namely, the two-component developer) is possible without interruption of the operation of the printing system, as well as without drastic sudden changes of the properties of the pourable medium and, on the other hand, the perpetuation of a predetermined fill level over the total life of the system is possible without knowledge of the concentration of the components in the pourable medium.

The exemplary embodiments explained previously are suited not only for electro-photographic devices of the type explained above, but rather in practice for all devices that operate with expired pourable used substances. For example, it can thereby also be a fluid development system with a carrier fluid as an expired medium, or also systems that are independent of image development systems and operate with expired pourable mediums to be exchanged.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

The invention claimed is:

1. A method for replacement of at least one expired component of a pourable medium, comprising the steps of:
   providing a container from which at a removal output at least the one expired component of the pourable medium is removed and into which a quantity of at least one of fresh pourable medium and a fresh component is supplied at a supply input;
   providing said input and said output for the container such that a predetermined fill level of the pourable medium in the container remains approximately the same;
   positioning said supply input such that it is dependent upon a pressure created by the pourable medium in the container at an output of the supply input into said container when the pourable medium is substantially at said predetermined fill level in order to block inflow from the supply input; and
   regulating the fill level of the pourable medium in the container by addition of the supply quantity caused by a lower pressure at the output of said supply input when the pourable medium is below said predetermined fill level and by said blocked inflow when the pourable medium is substantially at said predetermined fill level, wherein a developer to develop a latent image is provided as the pourable medium.

2. The method according to claim 1 wherein the output removes a quantity of expired medium equal to the supplied quantity.

3. The method according to claim 1 wherein the supply input and the removal output are arranged at the container such that, during the replacement of at least one of the expired pourable medium with fresh pourable medium and the fresh component, no fresh medium or its component is removed at a same time with the expired medium.

4. The method according to claim 1 wherein a metering device is provided in the removal output to set a predetermined quantity of expired medium to be removed.

5. The method according to claim 4 wherein the metering device is a valve.

6. The method according to claim 1 wherein the removal output at the container is arranged at its lowest level.

7. The method according to claim 1 wherein it is used in one of an electro-photographic, magneto-graphic, and ionographic printer or copier.

* * * * *